(12) United States Patent
Pinheiro et al.

(10) Patent No.: US 12,349,158 B2
(45) Date of Patent: Jul. 1, 2025

(54) SUPPORTING CBRS OPERATION USING NON-REAL TIME RAN INTELLIGENT CONTROLLER (NON-RT RIC) APPLICATIONS

(71) Applicant: Mavenir Systems, Inc., Richardson, TX (US)

(72) Inventors: Ana Lucia Pinheiro, Philadelphia, PA (US); Rangsan Leelahakriengkrai, Allen, TX (US); Wessam Afifi Ahmed, Plano, TX (US); Rasiklal Kachhla, Plano, TX (US); Neil Philip Piercy, Royston (GB); Prateek Bidwalkar, Pune (IN); Peter McCann, Bridgewater, NJ (US); Rajarajan Sivaraj, Plano, TX (US)

(73) Assignee: Mavenir Systems, Inc., Richardson, TX (US)

( * ) Notice: Subject to any disclaimer, the term of this patent is extended or adjusted under 35 U.S.C. 154(b) by 439 days.

(21) Appl. No.: 17/843,680

(22) Filed: Jun. 17, 2022

(65) Prior Publication Data
US 2023/0040563 A1    Feb. 9, 2023

(30) Foreign Application Priority Data
Jun. 23, 2021   (IN) .............................. 202121028200

(51) Int. Cl.
*H04W 72/23* (2023.01)
*H04W 16/14* (2009.01)
*H04W 40/02* (2009.01)
*H04W 88/08* (2009.01)
*H04W 88/12* (2009.01)

(52) U.S. Cl.
CPC ........... *H04W 72/23* (2023.01); *H04W 16/14* (2013.01); *H04W 40/02* (2013.01)

(58) Field of Classification Search
CPC ...... H04W 72/23; H04W 16/14; H04W 40/02
See application file for complete search history.

(56) References Cited

U.S. PATENT DOCUMENTS

| | | | |
|---|---|---|---|
| 2020/0305159 A1 | 9/2020 | Raghothaman et al. | |
| 2021/0029562 A1* | 1/2021 | Notargiacomo | H04W 8/183 |
| 2022/0053337 A1* | 2/2022 | Yang | H04W 64/00 |

OTHER PUBLICATIONS

O-RAN Architecture Description (Year: 2020).*
(Continued)

*Primary Examiner* — Xuan Lu
(74) *Attorney, Agent, or Firm* — Ruggiero McAllister & McMahon LLC (57) ABSTRACT

A wireless communications system includes radio components (O-RU, O-DU, O-CU), an ORAN Non-Real-Time RAN Intelligent Controller (Non-RT RIC) framework, an O-RU Controller and a CBSD Controller interfacing with a Spectrum Access System (SAS) using the Wireless Innovation Forum (WINNF) CBSD-SAS Interface. An example of CBSD Controller is a Domain Proxy (DP) defined by WINNF. The CBSD Controller is disclosed as an application belonging to the Non-RT RIC. This application could be an rApp. The Non RT MC Framework operates as a broker to route information between the O-RU Controller and the CBSD Controller. Data types are defined to be exchanged over the R1 interface.

19 Claims, 8 Drawing Sheets

(56) References Cited

OTHER PUBLICATIONS

Smith et al: "An 0-RAN Approach to Spectrum Sharing Between Commercial 5G and Government Satellite Systems", MILCOM 2021—2021 IEEE Military Communications Conference (MILCOM), IEEE, Nov. 29, 2021 (Nov. 29, 2021), pp. 739-744.
Brown: "The Role of the RAN Intelligent Controller in Open RAN Systems", STL, Oct. 2020 (Oct. 2020), pp. 1-11; URL:https://www.stl.tech/white-papers/the-role-of-the-ran-intelligent-controller-in-open-ran-systems.php.
Extended European Search Report for corresponding European Patent Application No. EP22180437.0, 12 pages, dated Oct. 26, 2022.
O-RAN Working Group 1"O-RAN Architecture Description v03.00" O-Ran Alliance, Feb. 2021.
Mavenir: "Mavenir Campus Network with Cloud Hosted Open RAN 4G/5G CBRS/OnGo Capability, Launched in Dallas TX—Mavenir", Jun. 16, 2021 (Jun. 16, 2021), XP055970744, Retrieved from the Internet: URL:https://www.mavenir.com/press-releases/mavenir-campus-network-with-cloud-hosted-open-ran-4g-5g-cbrs-ongo-capability-launch ed-in-dallas-tx.
Niknam et al.: "Intelligent O-RAN for Beyond 5G and 6G Wireless Networks", arxiv.org, Cornell University Library, 201 Olin Library Cornell University Ithaca, NY 14853, May 17, 2020 (May 17, 2020).
O-RAN Working Group 2 "Non-RT RIC: Functional Architecture v01.01"; O-Ran Alliance, Mar. 12, 2021.
O-RAN Working Group 4"Management Plane Specification v05.00" O-Ran Alliance, Dec. 10, 2020.

\* cited by examiner

SUPPORTING CBRS OPERATION USING NON-REAL TIME RAN INTELLIGENT CONTROLLER (NON-RT RIC) APPLICATIONS

BACKGROUND OF THE DISCLOSURE

1. Field of the Disclosure

The present disclosure relates to systems and methods for Radio Access Networks (RANs) and relates more particularly to CBRS operation in Open RANs (O-RANs) architecture and using O-RAN architecture for 4G and 5G.

2. Description of the Related Art

Conventional RANs were built employing an integrated unit where the entire RAN was processed. Conventional RANs implement the protocol stack (e.g., Physical Layer (PHY), Media Access Control (MAC), Radio Link Control (RLC), Packet Data Convergence Control (PDCP) layers) at the base station (also referred to as the evolved node B (eNodeB or eNB) for 4G LTE or next generation node B (gNodeB or gNB) for 5G NR). In addition, conventional RANs use application specific hardware for processing, which make the conventional RANs difficult to upgrade and evolve. As future networks evolve to have massive densification of networks to support increased capacity requirements, there is a growing need to reduce the capital costs (CAPEX) and operating costs (OPEX) of RAN deployment and make the solution scalable and easy to upgrade.

Cloud-based Radio Access Networks (CRANs) are networks where a significant portion of the RAN layer processing is performed at a baseband unit (BBU), located in the cloud on commercial off the shelf servers, while the radio frequency (RF) and real-time critical functions can be processed in the remote radio unit (RRU), also referred to as the radio unit (RU). The BBU can be split into two parts: centralized unit (CU) and distributed unit (DU). CUs are usually located in the cloud on commercial off the shelf servers, while DUs can be distributed. The BBU may also be virtualized, in which case it is also known as vBBU. Radio Frequency (RF) interface and real-time critical functions can be processed in the Radio Unit (RU), sometimes referred to as Remote Radio Unit (RRU).

O-RAN Summary

Figure 1:
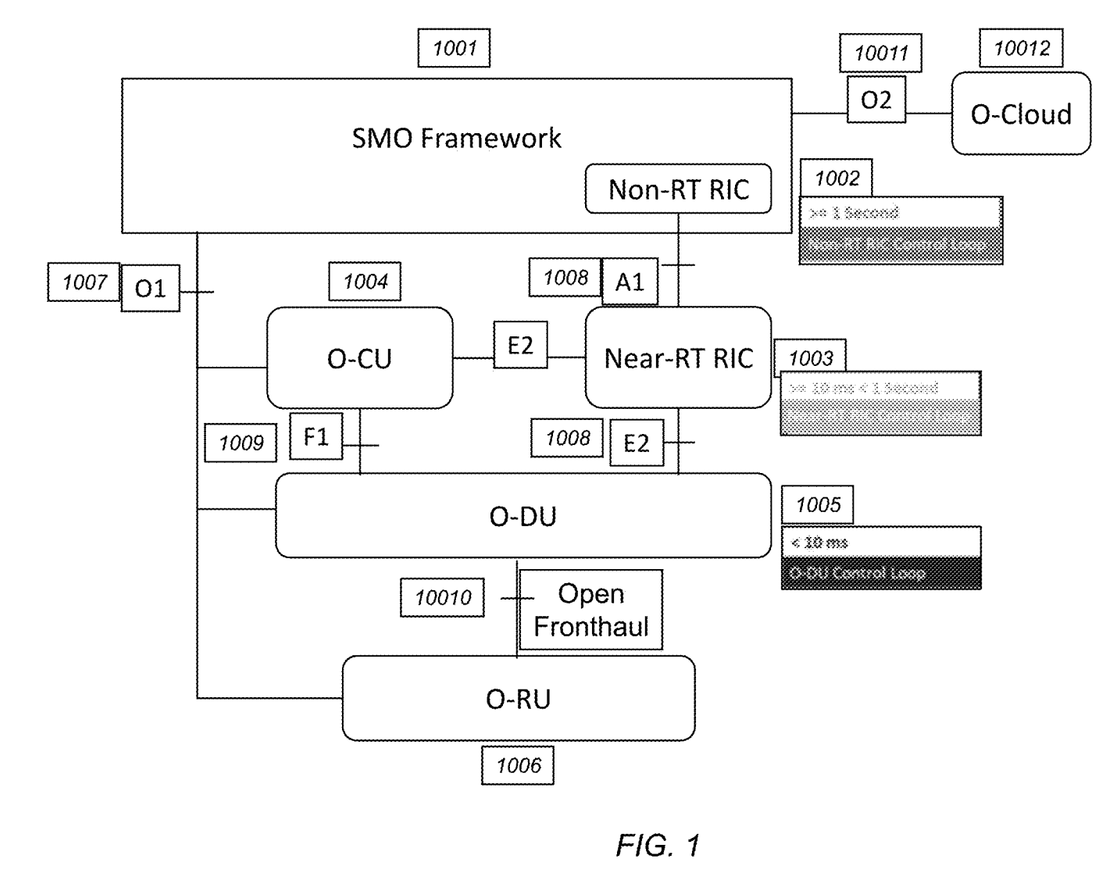
FIG. 1 shows the O-RAN high level logical architecture.

The O-RAN architecture is a Cloud-based architecture specified by the O-RAN Alliance. The architecture of the O-RAN system is specified in, e.g., O-RAN.WG1.O-RAN-Architecture-Description-v03.00. The high level logical architecture is depicted in FIG. 1. The components of the architecture include the Service Management and Orchestrator (SMO) Framework 1001, the Non-Real Time (Near-RT) Radio Intelligent Controller (MC) 1002, the Near-Real Time (Near-RT) Radio Intelligent Controller (MC) 1003, The O-RAN Centralized Unit (O-CU) 1004, the O-RAN Distributed Unit (O-DU) 1005, and the O-RAN Radio Unit (O-RU) 1006.

The Service Management and Orchestrator (SMO) Framework 1001 is responsible for the management of the O-RAN components (O-CU, O-DU and O-RU). The SMO uses the O2 interface 1011 to connect with the O-Cloud 1012. The management interface between the SMO and the O-RAN components is the O1 interface 1007.

The RAN Intelligent Controller (MC) contains Radio Resource Management (RRM) functions that help control and optimize the components and the utilization of radio resources. It is divided in Non-Real Time RIC 1002 and Near-Real Time MC 1003.

The Non-RT RIC 1002 is the functionality internal to the SMO 1001. Its primary goal is to support intelligent RAN optimization. It provides policy-based guidance, ML (Machine Learning) model management, and enrichment information to the Near-RT MC function, supporting RRM (Radio Resource Management) optimizations of the Near-RT MC. It can also perform intelligent RRM functions in non-real-time fashion (i.e., greater than 1 second). It communicates to the Near-RT MC via the A1 interface 1008.

The Near-RT RIC 1003 is a logical function that enables near real-time control and optimization of radio components and resources via fine grained data collection and actions over the E2 interface. Its control loops operate in the order of 10 ms to 1s. The Near-RT RIC hosts one or more applications that use E2 interface 1008 to collect near real-time information (e.g., on a UE basis or a Cell basis) and provide value added services. The Near-RT RIC control over the radio components is steered via the policies and the enrichment data provided via A1 interface 1008 from the Non-RT MC 1002.

The data between the O-CU and O-DU is carried over the F1 interface 1009. The O-DU is responsible for scheduling the data transmission over the air, and the O-DU scheduler runs a control loop in the order of milliseconds (<10 ms). The data between O-DU and O-RU is sent over the open fronthaul interface.

Figure 2:
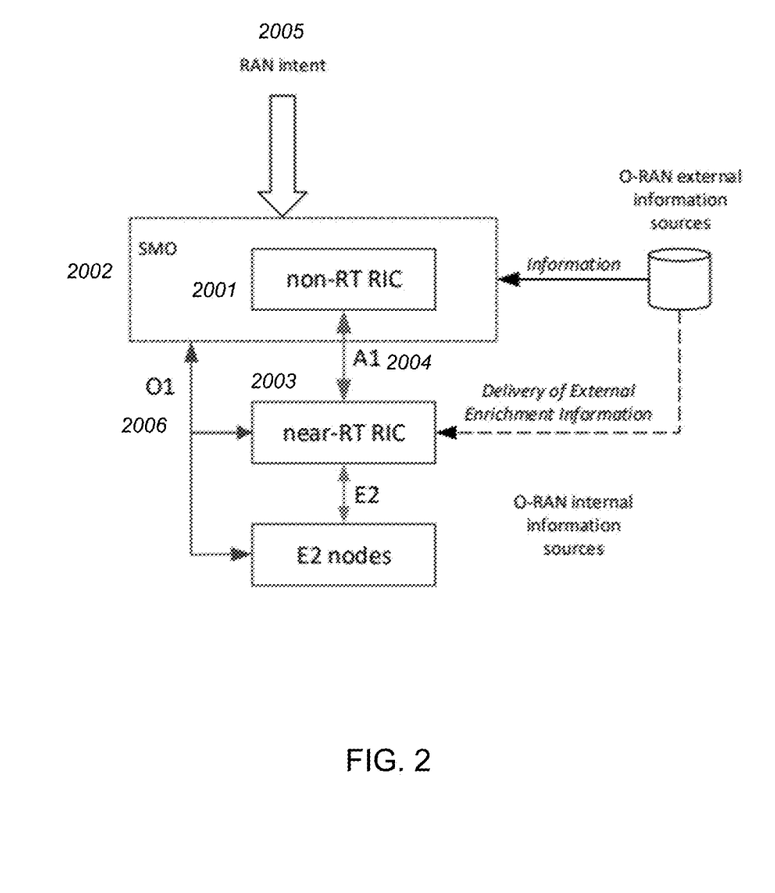
FIG. 2 shows the relationship of the Non-RT RIC and Near-RT MC.

The relationship of the Non-RT MC and Near-RT MC is illustrated in FIG. 2. The Non-RT RIC 2001 is the part of the SMO framework 2002 that communicates to the Near-RT MC 2003 using the A1 interface 2004. Based on high level directives (goals for the system) expressed in RAN Intent 2005, and based on observables (events and counters) provided over O1 2006, the Non-RT RICO 2001 defines policies that are provided to the near-RT RIC 2003 over the A1 interface 2004.

The purpose of the A1 policies is to guide the RAN performance towards the overall goal expressed in RAN Intent. The A1 policies are declarative policies that contain statements on policy objectives and policy resources applicable to UEs and cells. The Non-RT RIC manages the A1 policies based on A1 policy feedback, and on the network status provided over O1. The Non-RT RIC uses the O1 observables to continuously evaluate the impact of the A1 policies towards fulfillment of the RAN Intent. Based on internal conditions, the Non-RT MC decides to issue and/or update the directives expressed in the A1 policies.

The Near-RT MC decisions are based on its internal functions or applications, the configuration received over O1 and the temporary policies received over A1 from the Non-RT RIC. In order to support the policy enforcement in the Near-RT RIC, the Non-RT RIC can also provide enrichment information over the A1 interface.

CBRS Summary

One of the technologies recently standardized is operation over shared spectrum such as Citizens Broadband Radio Service (CBRS) band in the U.S., which band is from 3.55 GHz-3.7 GHz. Similar shared spectrum paradigms also exist in other countries. CBRS opens new ways to use spectrum in the 3.5 GHz band in the US by sharing spectrum across legacy and new users. There are 3 tiers of users sharing the CBRS band. The first tier includes "incumbents," who are legacy/existing users of the CBRS band, e.g., military shipborne radars in coastal areas, military ground-based radars, fixed satellite services (FSS) receive-only earth stations (35 sites around US, mostly in coastal areas), and Grandfathered Wireless Broadband Licensees (GWBL). The second tier includes Priority Access License (PAL) users, who are CBRS devices (CBSDs, Citizens Broadband Radio Service Device) having one or more licenses to use a portion of the CBRS band. PAL users, who have a lower priority than incumbents, are restricted to a total of 70 MHz within 3.55-3.65 GHz band in the CBRS band. The third tier includes General Authorized Access (GAA) users, who are CBSDs using the CBRS band without holding a license. GAA users, who have a lower priority than PAL users, are the lowest tier of the 3-tier architecture. GAA users can only use the spectrum if no incumbents or PAL users are using the channel at a given location. GAA users have access to the entire 150 MHz of the CBRS band.

Figure 3:
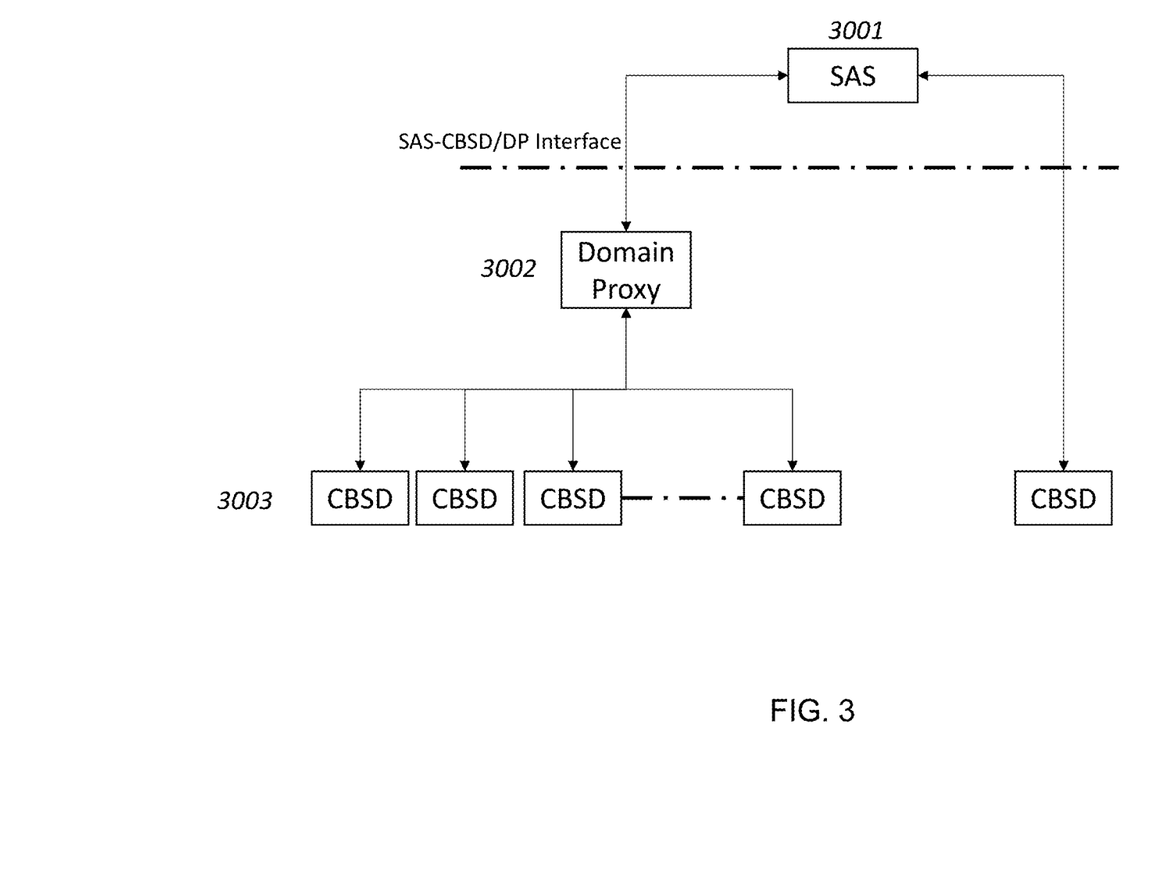
FIG. 3 shows the main components of the CBRS architecture.

FIG. 3 shows the main components of the CBRS architecture: The Spectrum Access System (SAS) 3001, the Domain Proxy (DP) 3002, and the CBSDs 3003. CBSD includes, e.g., fixed stations and/or radios, or networks of such stations or radios, that operate on a PAL or GAA basis consistent with the regulations specified in Title 47 of the Code of Federal Regulations (CFR), § 96. For CBSDs which comprise multiple nodes or networks of nodes, CBSD requirements apply to each node even if network management and communication with the SAS is accomplished via a single network interface. CBSD obtains Grants from the SAS via the SAS-CBSD interface (which may be done with the assistance of DP 3002 in the communication path, or directly between SAS 3001 and CBSDs 3003). The DP 3002 is a logical entity engaging in communications with the SAS on behalf of multiple individual CBSDs or networks of CBSDs. The DP can also provide a translational capability to interface legacy radio equipment in the 3650-3700 MHz band with a SAS to ensure compliance with the regulations specified in Title 47 of the Code of Federal Regulations (CFR), § 96 (hereinafter referred to as 47 CFR § 96). The DP presents a consistent and secure interface to the SAS that can convey all messages pertaining to the SAS-CBSD interface for client CBSDs. CBSD aggregation and proxy function for large networks can be integrated within a Service Management and Orchestration (SMO) system or in a standalone node. SAS 3001 is a system that authorizes and manages use of spectrum for the CBRS in accordance with the regulations specified in 47 CFR § 96.

SUMMARY OF THE DISCLOSURE

According to an example embodiment of the present disclosure, a wireless communications system is disclosed, comprising: radio components (O-RU, O-DU, O-CU), an ORAN Non-Real-Time RAN Intelligent Controller (Non-RT RIC) framework, an O-RU Controller and a CBSD Controller interfacing with a Spectrum Access System (SAS) using the Wireless Innovation Forum (WINNF) CBSD-SAS Interface.

According to an example embodiment of the present disclosure, an example of CBSD Controller is a Domain Proxy (DP) defined by WINNF.

According to an example embodiment of the present disclosure, the CBSD Controller is an application belonging to the Non-RT RIC.

According to an example embodiment of the present disclosure, the CBSD Controller is an rApp.

According to an example embodiment of the present disclosure, the Non RT MC Framework operates as a broker to route information between the O-RU Controller and the CBSD Controller.

According to an example embodiment of the present disclosure, the data types are defined to be exchanged over the R1 interface.

DETAILED DESCRIPTION

A CBSD starts off in the Unregistered state. An Unregistered CBSD can send a RegistrationRequest object to the SAS and if the SAS approves the registration in a RegistrationResponse object, the CBSD transitions to the Registered state. If the SAS rejects the registration in a RegistrationResponse object, the CBSD remains in the Unregistered state. A CBSD in the Registered state can also send a DeregistrationRequest object to deregister the CBSD.

After registration, RUs need to get a Grant in order to be able to transmit. A CBSD Grant is the authorization provided by a SAS to a CBSD to transmit using specified operating parameters. Grants are identified by a unique Grant identifier (GrantId). Once issued, a Grant's operating parameters are never changed; if new or modified operating parameters are required, then a new Grant must be obtained. The Grant's operating parameters are maximum EIRP and Channel. A channel is defined by a minimum frequency and maximum frequency.

Figure 4:
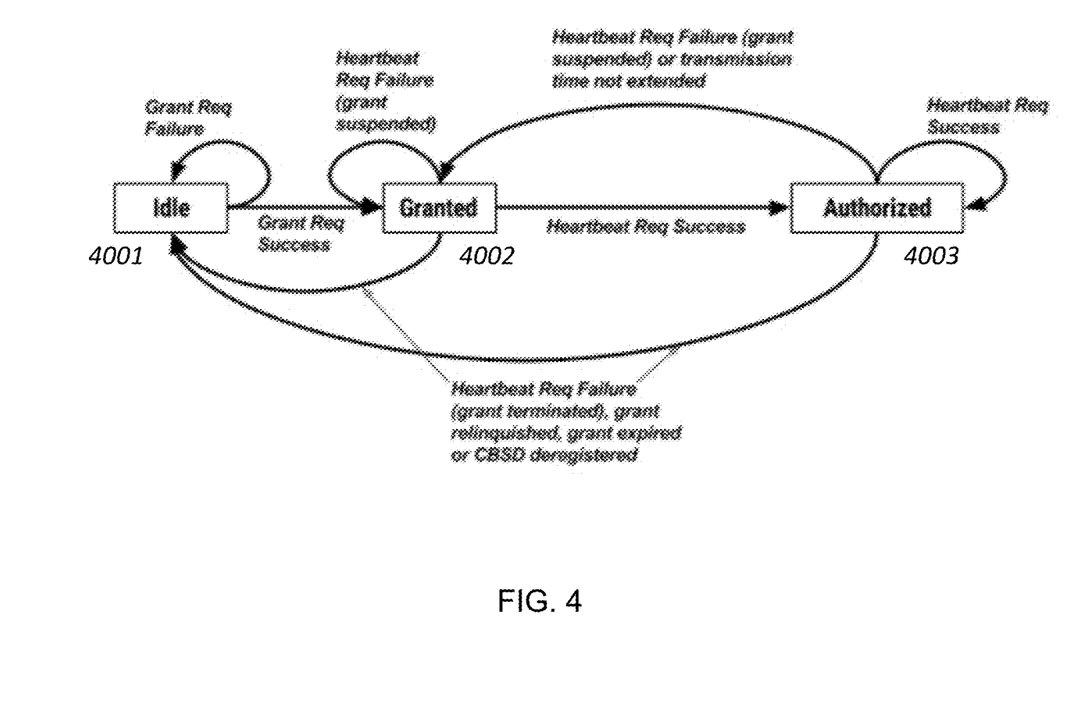
FIG. 4 shows a Grant state machine.

FIG. 4 shows a Grant state machine. Each Grant, represented by a GrantId, has its own state machine. A Grant state machine is in the Idle state 4001 if a Grant has not been approved by the SAS. A CBSD can send the SAS a GrantRequest object. If a Grant request is approved by the SAS, the SAS will send a GrantResponse object. Upon reception of a successful GrantResponse object from the SAS, the Grant transitions to Granted state 4002. In Granted state a GrantId is assigned, operational parameters are defined, and a channel is allocated. A CBSD with a Grant that is ready to commence RF transmission commences Heartbeat procedure associated with the Grant by sending HeartbeatRequest object. If the SAS approves a Heartbeat Request, the SAS sends a HeartbeatResponse object authorizing the transmission. Upon reception of a successful HeartbeatResponse object, the Grant transitions to the Authorized state 4003. In the Authorized state 4003, the CBSD is permitted to commence RF transmission and operate in the CBRS band using the operational parameters specific to that Grant. If a CBSD receives multiple Grants, individual state machines are kept for each Grant, and individual heartbeat requests need to be sent for each Grant, possibly aggregated in a single transmission to the SAS.

The Grant transitions from the Authorized state 4003 back to the Granted state 4002 if the Grant is suspended by the SAS or the transmission right, as defined by the transmitExpireTime parameter in the HeartbeatResponse object, has expired. The Grant transitions to Idle state 4001 if a Grant is terminated by the SAS, relinquished by the CBSD, or expired as defined in the grantExpireTime parameter, or the SAS-to-CBSD connectivity is lost.

Figure 5:
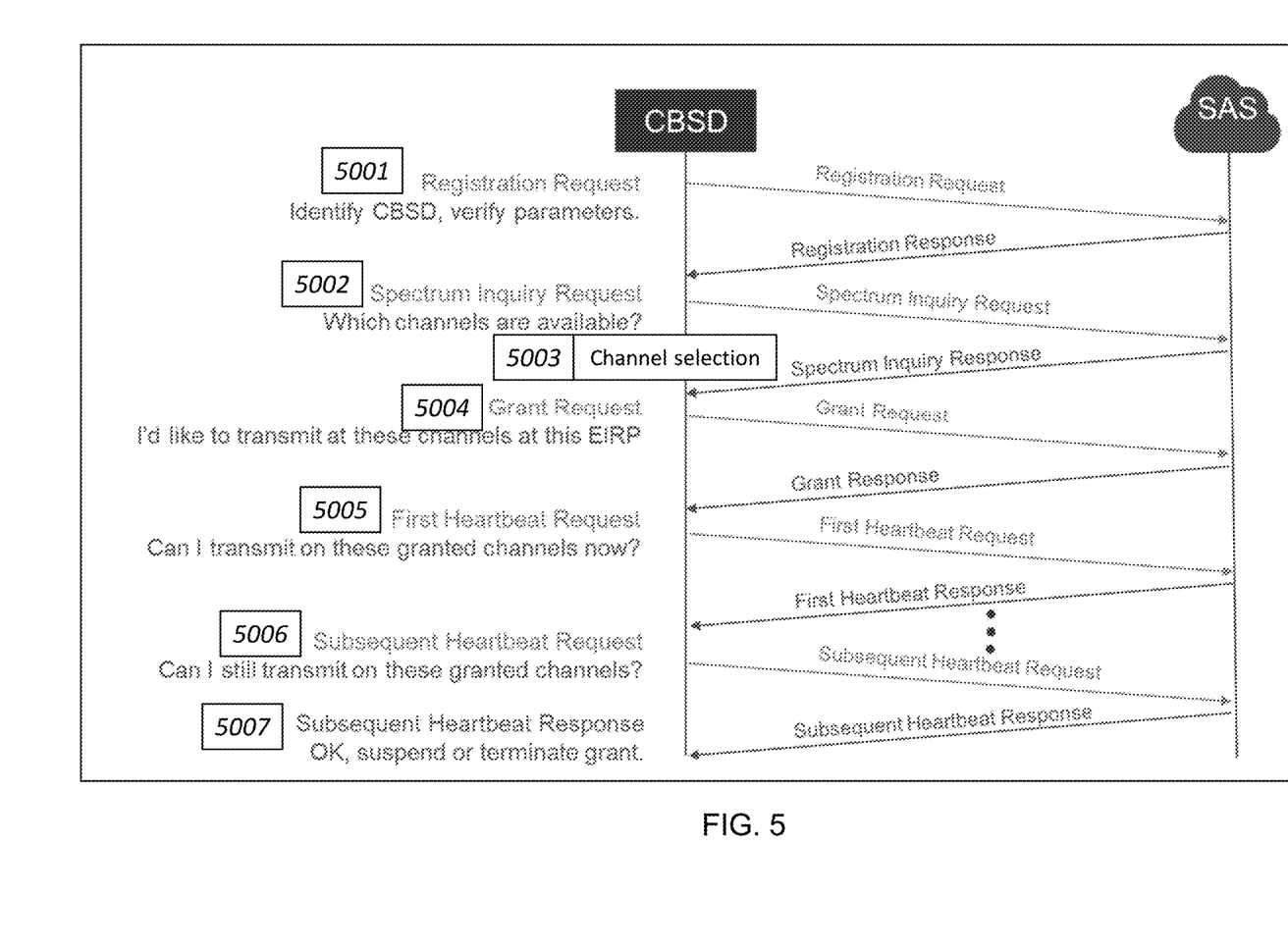
FIG. 5 shows the CBRS procedures.

The CBRS procedures are depicted in FIG. 5. When the CBSD device (or O-RU) starts-up, it will register with the SAS by sending a RegistrationRequest object 5001. The RegistrationRequest includes operational parameters of the O-RU, including its physical location (latitude, longitude, altitude). The SAS will accept the registration by sending a RegistrationResponse object. In order to be able to find out which channels are available in the area where the CBSD wants to transmit, the CBSD performs the Spectrum Inquiry procedure 5002. The CBSD sends the SpectrumInquiry object to the SAS with a list of channels of interest. The SpectrumInquiryResponse includes all available channels in the transmission area. The transmission area is defined based on the physical location of the CBSD.

Based on the available channels, the CBSD now chooses one or more channels 5003 and requests a Grant via the Grant Request procedure 5004. If the request is Granted by the SAS, after the reception of the GrantResponse object, the CBSD starts the Heartbeat procedure 5005. The GrantResponse object will also include the maximum power that the O-RU can transmit, which is to limit possible interference in the CBRS band.

After the first successful HeartbeatResponse is received from the SAS, the CBSD (O-RU) may start transmitting in the channel associated with that grant. The CBSD keeps sending HeartbeatRequest object periodically 5006 to the SAS, as a form of "keep alive" mechanism. The procedure continues and the O-RU may continue transmitting in the channel until the SAS suspends or terminates the grant via a HeartbeatResponse object asking for such suspension or termination 5007. Additionally, if the CBSD decides to stop transmitting, the CBSD will send a GrantRelinquishment object to the SAS to notify the SAS that it no longer needs the channel associated with that grant.

The Domain Proxy (DP) is the entity that can handle the CBRS procedures with the SAS on behalf of the CBSDs. The basic functionality of the DP is to be a "proxy" for the CBSD. Part of this functionality includes the aggregation of the information coming from/to several CBSDs to/from the SAS. This reduces the number of messages and the number of connections that need to be established between the SAS and the CBSDs. Additionally, this helps by offloading the CBRS functionality from the O-RU to the DP. As an example, the O-RU does not need to keep sending periodic HeartbeatRequest objects to the SAS, since the DP will handle that procedure on behalf of the O-RU.

After the O-RU starts up, the DP is notified of the O-RU information (e.g., its physical location, bands supported, number of channels supported, maximum transmit power, and antenna configuration). The DP will register the O-RU with the SAS and provide the O-RU operational parameters as needed. After the Registration is successful, the DP performs the Spectrum Inquiry procedure. Once the DP knows which channels are available for the O-RU, it will perform the channel selection for the O-RU and request for a grant in the selected channel. After the grant is allocated, and the heartbeat procedure is successful, the DP informs the CBSD of the channel allocation, and the O-RU may start transmitting in that channel. The DP starts a periodic Heartbeat procedure on behalf of the O-RU towards the SAS, and the DP only needs to communicate with the O-RU again in case there is a change triggered by the SAS, such as a grant expires, or the SAS terminates or suspends a grant.

Note that the result of the CBRS procedures involves cell configuration, cell reconfiguration, cell activation and cell deactivation towards the O-RAN radio components (O-RU, O-DU and O-CU). In the O-RAN model, this functionality belongs to the SMO. Additionally, the DP functionality is much more than just a proxy for the O-RUs toward the SAS. The DP performs the channel selection procedure on behalf of the CBSDs. In addition, as the DP may be acting on behalf of several CBSDs in a given deployment, when performing the channel selection for a given O-RU, the DP may take into account several network aspects, e.g., the type of deployment, the operational capabilities of the O-RU, the antenna configuration of the O-RU, the O-RU physical location and its location relative to other CBSD devices in the same network, the current channel allocation for other CBSD devices in the same network, the traffic expected for the O-RU based on the O-RU physical location, day of the week, and time of day, etc. By taking into account many aspects, the DP may function as the "spectrum manager and negotiator" for a large set of O-RUs in a given deployment. In other words, the DP is performing Radio Resource Management (RRM) functions for the O-RUs.

This DP functionality of RRM, combined with the fact that the result of CBRS procedures will trigger a cell configuration, reconfiguration, activation or deactivation, make the DP an excellent candidate for a function belonging to the SMO framework. In addition, as this type of RRM function can be classified as non-real-time, it fits well in the Non-RT MC domain.

Non-RT MC Domain

Figure 6:
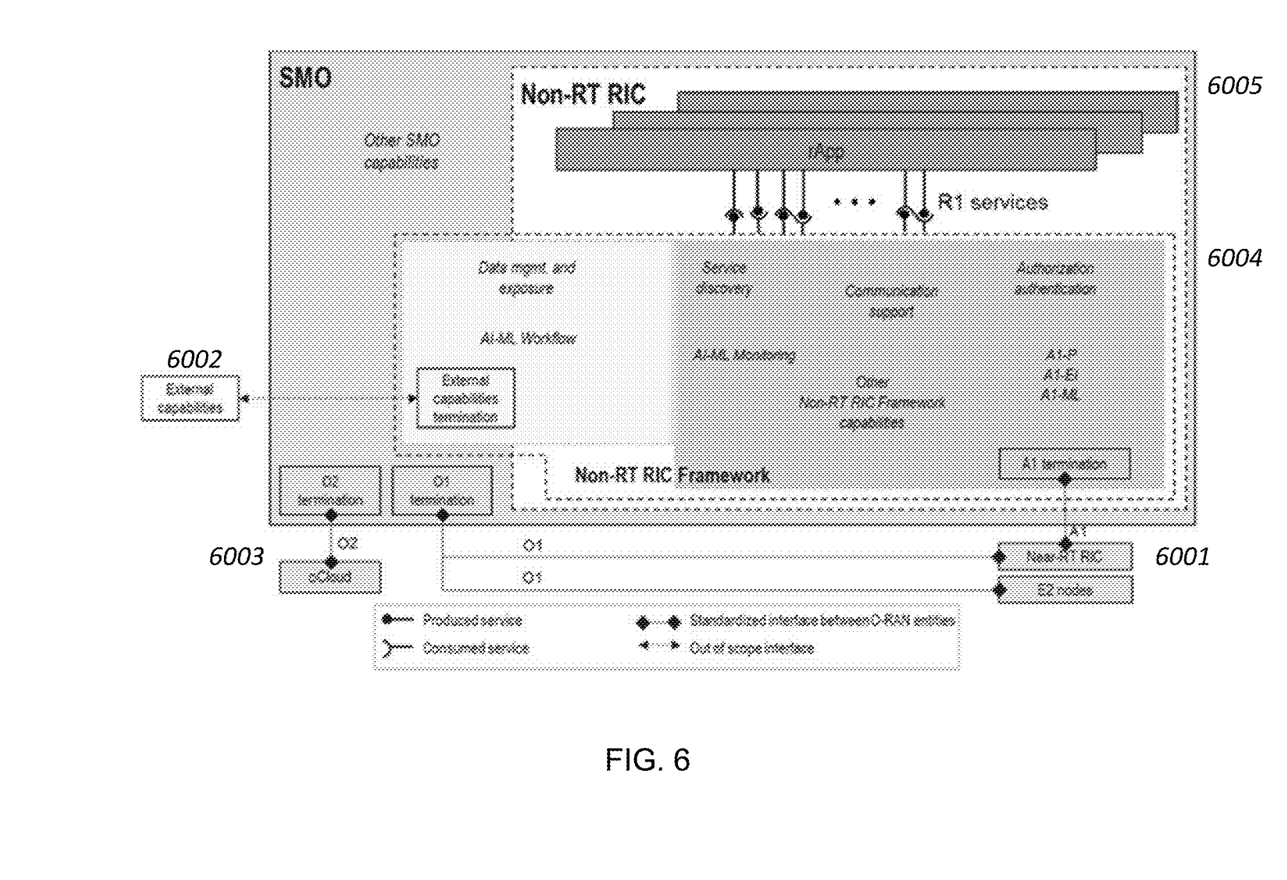
FIG. 6 shows the Non-RT MC domain.

The Non-RT RIC domain is shown in FIG. 6. The Non-RT RIC has two interfaces to other domains: The A1 interface termination 6001 to the Near-RT MC and an external interface termination 6002 to access external functions and capabilities. Being part of the SMO, the Non-RT MC may also indirectly utilize the O1 and O2 interfaces 6003.

Within the Non-RT RIC domain, the Non-RT RIC Framework 6004 and the rApps 6005 are present. Some of the Non-RT MC Framework functions and services include providing policy-based guidance and enrichment information to the Near-RT MC, data analytics, artificial intelligence (AI) and/or machine learning (ML) training, inference for RAN optimization, and recommendations for configuration management actions over O1 interface.

rApps 6005 are modular applications that leverage the functionality exposed by the Non-RT MC to provide added value services relative to intelligent RAN optimization and operation. The Non-RT MC framework functions provide services to rApps via the R1 interface 6006. The R1 interface is an Open application programming interface (API).

The R1 interface is an Open API and provides a level of abstraction such that an rApp that is a producer of data ("producer rApp") does not need to know whether there exists one or multiple consumers for that data, or the nature of that consumer. In other words, the "producer rApp" does not need to know if the consumer of the data is a "consumer rApp" or is an entity external to the Non-RT RIC or SMO). Additionally, the R1 interface provides functionality such that a "consumer rApp" does not need to know if the data consumed is the product of a single entity (e.g., a single "producer rApp"), or the combined output of a complex chain of entities (e.g., a chain of rApps each consuming the value-added product of another).

Figure 7:
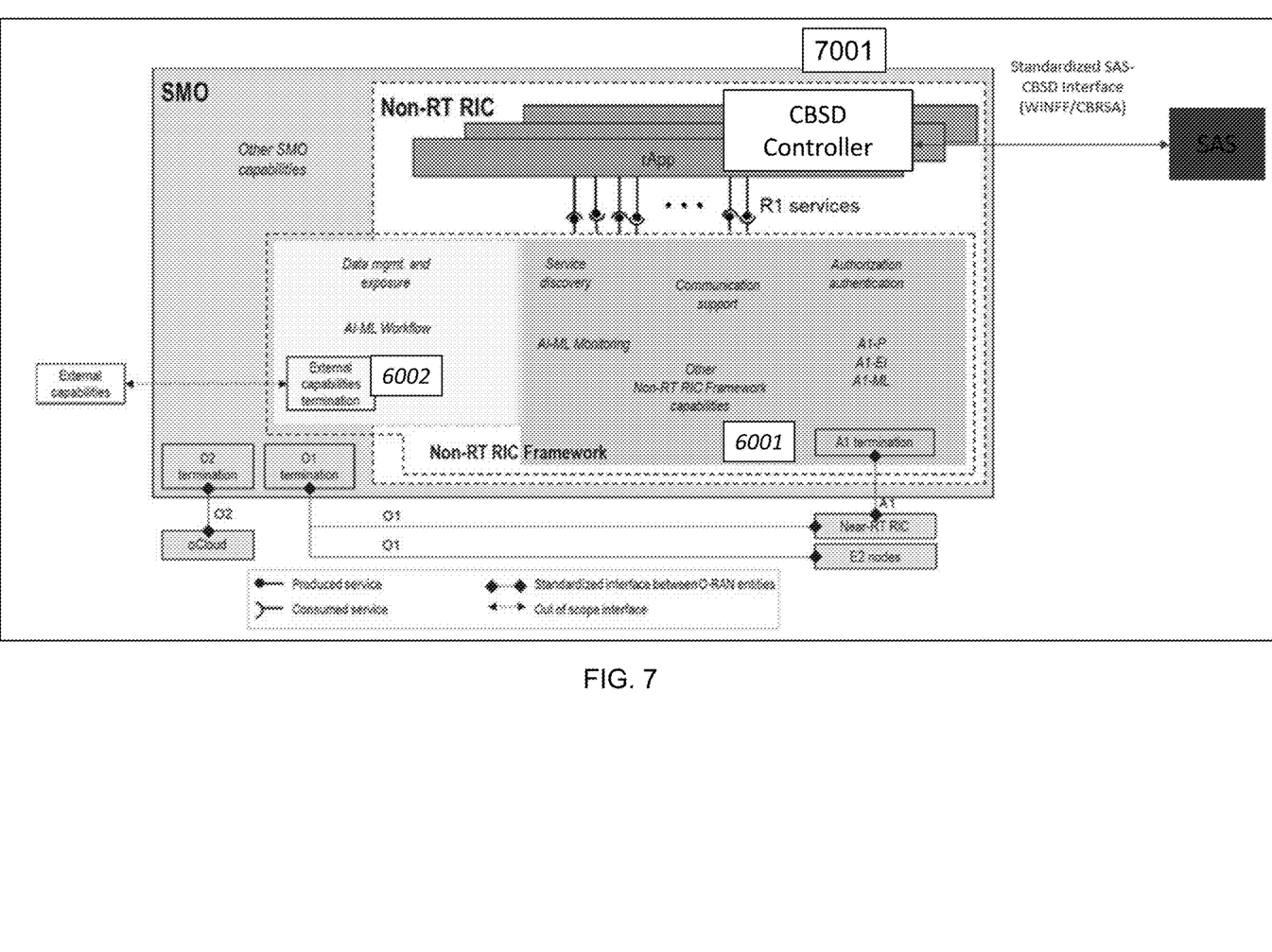
FIG. 7 shows the CBSD Controller included in the O-RAN architecture as an application in the Non-RT MC domain, or an rApp.

FIG. 7 shows one example embodiment in which a "CBSD Controller" 7001 is disclosed as an "rApp". The CBSD Controller interfaces with the SAS using the CBRS procedures described in previous paragraphs to obtain grants for the O-RUs. The CBSD—Controller-rApp may implement all the functionality of the Domain Proxy, in which case one rApp will communicate with the SAS on behalf of several O-RUs.

According to O-RAN.WG2.Non-RT-RIC-ARCH-TR-v01.01, a deployed rApp instance shall be able to use the R1 interface to communicate information relating the data type (s) and periodicity that the rApp consumes and produces, in that sequence. The Non-RT RIC Framework will match rApp data consumption needs against known data sources.

Figure 8:
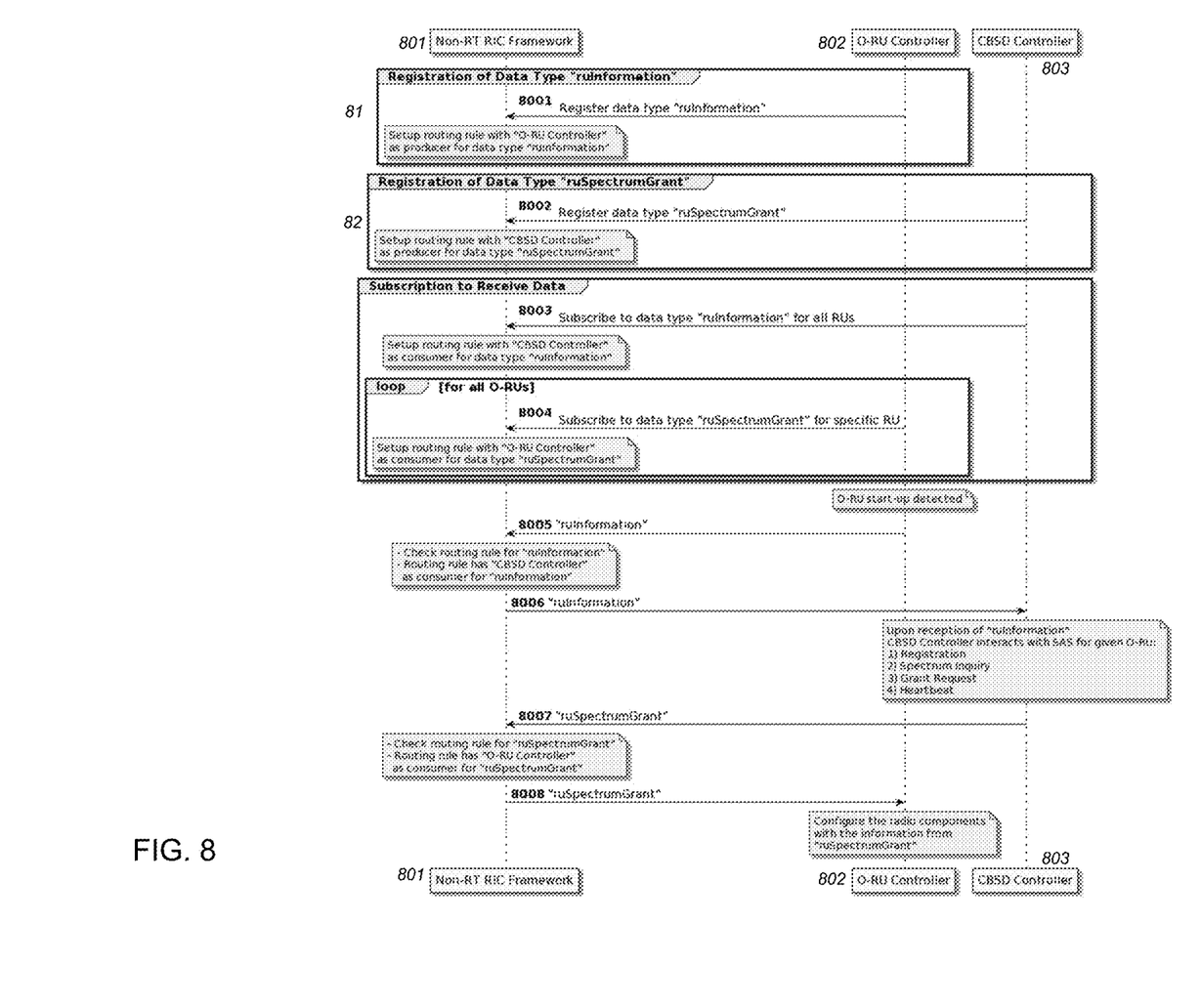
FIG. 8 shows an example embodiment illustrating how the rApp can function utilizing the R1 interface.

FIG. 8 shows one example embodiment illustrating how the rApp can function utilizing the R1 interface. The O-RU Controller is defined in O-RAN.WG4.MP.0-v05.00 as a network function that is permitted to control the configuration of an O-RU. Examples of O-RU controllers include, an O-DU, a classical Network Management System (NMS), an O-RAN Service Management and Orchestration function, or other network automation platforms. FIG. 8 illustrates the Non-RT MC Framework 801 interacting with the O-RU Controller 802 and CBSD Controller 803 to provide the necessary information to each component.

In one example embodiment (shown in the box 81 of FIG. 8), the O-RU Controller 802 registers the data type "ruInformation", as shown by process arrow 8001. This data type contains the following information:
ruInformation Object Definition

| Parameter | Description |
| --- | --- |
| NAME: ruId<br>DATA TYPE: string | RU Identity |
| NAME: componentCarrierIdentity<br>DATA TYPE: string | Component Carrier Identity.<br>Each RU can support multiple component carrier in a Carrier Aggregation. |
| NAME: commonChannelGroup<br>DATA TYPE: string | Common Channel Group (CCG) or Single Frequency Group (SFG) Identity is a same frequency group which is a group of RU's that have to use spectrum grants with the same frequency range. A Same Frequency group can be viewed as a subset of a Frequency Reuse group. |
| NAME: interferenceCoordinationGroup<br>DATA TYPE: string | Interference Coordination Group (ICG) or Spectrum Reuse Group (SRG) Identity. This is a group of RU's that will not cause interference issues to each other if they use spectrum grants with the same frequency range. They do not have to use spectrum with the same frequency range. |

In another example embodiment, the O-RU Controller 802 can register the data type "ruInformationArray". This data type contains the following information:
ruInformationArray Object Definition

| Parameter | Description |
| --- | --- |
| NAME: ruInformationMessage<br>DATA TYPE: array of object:<br>ruInformation | Array of ruInformation object.<br>Each object represent the information to for the CBRS Controller to request the spectrum for the RU. |

The Non-RT MC Framework 801 sets up a routing rule with "O-RU Controller" as producer for data type "ruInformation".

In one example embodiment (shown in the box 82 of FIG. 8), the CBSD Controller 803 registers the data type "ruSpectrumGrant", as shown by the process arrow 8002. This data type contains the following information:
ruSpectrumGrant Object Definition

| Parameter | Description |
| --- | --- |
| NAME: ruId<br>DATA TYPE: string | RU Identity |
| NAME: componentCarrierIdentity<br>DATA TYPE: string | Component Carrier Identity. |
| NAME: commonChannelGroup<br>DATA TYPE: string | Common Channel Group (CCG) or Single Frequency Group (SFG) Identity. |
| NAME: lowFrequency<br>DATA TYPE: number | The lowest frequency in the granted frequency range which is from lowFrequency to highFrequency. Unit Hz. |
| NAME: highFrequency<br>DATA TYPE: number | The highest frequency in the granted frequency range which is from lowFrequency to highFrequency. Unit Hz. |
| NAME: maxEirp<br>DATA TYPE: number | Maximum EIRP likely to be permitted for a Grant on this frequency range. The maximum EIRP is in the units of dBm/MHz and is an integer or a floating point value between −137 and +37 (dBm/MHz) inclusive. |

In another example embodiment, the CBSD Controller 803 can register the data type "ruSpectrumGrantArray". This data type contains the following information:
ruSpectrumGrantArray Object Definition

| Parameter | Description |
| --- | --- |
| NAME: ruSpectrumGrantMessage<br>DATA TYPE: array of object:<br>ruSpectrumGrant | Array of ruSpectrumGrant objects.<br>Each object represent the information from the CBRS Controller on the granted spectrum for the RU. |

The Non-RT RIC Framework 801 sets up a routing rule with "CBSD Controller" as producer for data type "ruSpectrumGrant".

The CBSD Controller 803 subscribes to data type "ruInformation", for all RUs controlled by the O-RU Controller 802, as shown by the process arrow 8003.

The Non-RT RIC Framework 801 sets up a routing rule with "CBSD Controller" as consumer for data type "ruInformation".

In one example embodiment, the O-RU Controller 802 subscribes to data type "ruSpectrumGrant" for each specific RU controlled by the CBSD Controller 803, as shown by the process arrow 8004.

In another example embodiment, the O-RU Controller 802 subscribes to data type "ruSpectrumGrantArray" containing all O-RUs of interest.

The Non-RT RIC Framework 801 sets up a routing rule with "O-RU Controller" as consumer for data type "ruSpectrumGrant".

O-RU start-up is detected in the O-RU Controller. The O-RU Controller 802 provides "ruInformation" related to that O-RU to the Non-RT MC Framework 801, as shown by the process arrow 8005. The Non-RT RIC Framework 801 checks the routing rule for "ruInformation". The routing rule has "CBSD Controller" as consumer for "ruInformation." The Non-RT RIC Framework 801 forwards the "ruInformation" to the CBSD Controller 803, as shown by the process arrow 8006.

Upon reception of "ruInformation", the CBSD Controller 803 interacts with SAS on behalf of the given O-RU and performs the following SAS-CBSD procedures on behalf of the CBSD: CBSD Registration, CBSD Spectrum Inquiry, CBSD Grant Request and CBSD Heartbeat Procedure. As a result of these procedures, after a successful Heartbeat response is received from the SAS, the CBSD Controller provides "ruSpectrumGrant" to the Non-RT RIC Framework 801, as shown by the process arrow 8007.

The Non-RT RIC Framework 801 checks the routing rule for "ruSpectrumGrant." The routing rule has the "O-RU Controller" as consumer for "ruSpectrumGrant." The Non-RT MC Framework 801 forwards the "ruSpectrumGrant" to the O-RU Controller 802, as shown by the process arrow 8008. The O-RU Controller 802 can now configure the radio components with the information provided in the "ruSpectrumGrant."

Definitions

CBRS band: The 3550-3700 MHz Citizens Broadband Radio Service band.

Citizens Broadband Radio Service Device (CBSD): Fixed Stations, or networks of such stations, that operate on a Priority Access or General Authorized Access basis in the Citizens Broadband Radio Service consistent with FCC regulations. For CBSDs which comprise multiple nodes or networks of nodes, CBSD requirements apply to each node even if network management and communication with the SAS is accomplished via a single network interface.

Domain Proxy (DP): An entity engaging in communications with the SAS on behalf of multiple individual CBSDs or networks of CBSDs. The Domain Proxy can also provide a translational capability to interface legacy radio equipment in the 3650-3700 MHz band with a SAS to ensure compliance with FCC Part 96 rules.

Grant: The authorization provided by a SAS to a CBSD, subject to a Heartbeat exchange, to transmit using specified operating parameters. Grants are identified by a unique Grant identifier. Once issued, a Grant's operating parameters are never changed; if new or modified operating parameters are required, then a new Grant must be obtained. The Grant's operating parameters are maximum EIRP and Channel. A Grant can be in different states as will be explained in this FRS.

M-Plane: Management Plane: refers to non-real-time management operations between the O-DU and the O-RU O-CU: O-RAN Control Unit—a logical node hosting PDCP, RRC, SDAP and other control functions O-DU: O-RAN Distributed Unit: a logical node hosting RLC/MAC/High-PHY layers based on a lower layer functional split.

O-RU: O-RAN Radio Unit: a logical node hosting Low-PHY layer and RF processing based on a lower layer functional split. This is similar to 3GPP's "TRP" or "RRH" but more specific in including the Low-PHY layer (Fast Fourier Transform (FFT) inverse Fast Fourier Transform (iFFT), Physical Random Access Channel (PRACH) extraction).

Spectrum Access System (SAS): A system that authorizes and manages use of spectrum for the Citizens Broadband Radio Service in accordance with FCC regulations.

What is claimed:

1. An information routing system for a wireless communications network having radio components including Open Radio Access Network Radio Unit (O-RU), ORAN Distributed Unit (O-DU), and ORAN Centralized Unit (O-CU), said information routing system comprising:
    an Open Radio Access Network (ORAN) Non-Real-Time RAN Intelligent Controller (Non-RT RIC) framework;
    an O-RU Controller; and
    a Citizens Broadband Radio Service Device (CBSD) Controller interfacing with a Spectrum Access System (SAS);
    wherein the Non RT RIC Framework is configured to function as a broker to route information between the O-RU Controller and the CBSD Controller.

2. The system according to claim 1, wherein the O-RU controller is configured as a producer of one of data type "ruInformation" or "ruInformationArray", and the CBSD Controller is configured as a consumer of one of the data type "ruInformation" or "ruInformationArray".

3. The system according to claim 2, wherein the "ruInformation" data type contains at least one of the following parameters for a given O-RU:
    RU Identity;
    Component Carrier Identity, wherein each O-RU can support multiple component carriers in a Carrier Aggregation;
    one of Common Channel Group (CCG) Identity or Single Frequency Group (SFG) Identity representing the group to which the given O-RU belongs, wherein all O-RUs obligated to use spectrum grants with the same frequency range must have one of the same CCG identity or the same SFG identity;
    one of Interference Coordination Group (ICG) Identity or Spectrum Reuse Group (SRG) Identity representing a group of O-RUs that will not cause interference with one another in the case the O-Rus use spectrum grants with the same frequency range.

4. The system according to claim 2, wherein the "ruInformationArray" data type contains an array of at least one vector, each vector contains one "ruInformation" data type, and each vector contains information related to one O-RU.

5. The system according to claim 1, wherein the CBSD Controller is configured as a producer of one of data type "ruSpectrumGrant" or "ruSpectrumGrantArray", and the O-RU Controller is configured as a consumer of one of data type "ruSpectrumGrant" or "ruSpectrumGrantArray".

6. The system according to claim 5, wherein the "ruSpectrumGrant" data type contains at least one of the following parameters for a given O-RU:
    RU Identity;
    Component Carrier Identity, wherein each O-RU can support multiple component carriers in a Carrier Aggregation;
    one of Common Channel Group (CCG) Identity or Single Frequency Group (SFG) Identity representing the group to which the given O-RU belongs, wherein all O-RUs obligated to use spectrum grants with the same frequency range must have one of the same CCG identity or the same SFG identity;
    low frequency, representing the lower boundary of the granted frequency range;
    high frequency, representing the upper boundary of the granted frequency range; and
    maximum Effective Isotropic Radiated Power (EIRP) likely to be permitted for the granted frequency range.

7. The system according to claim 5, wherein the "ruSpectrumGrantArray" data type contains an array of at least one vector, each vector contains one "ruSpectrumGrant" data type, and each vector contains information related to one O-RU.

8. The system according to claim 1, wherein the CBSD Controller is configured as an application, as part of Non-RT RIC domain.

9. The system according to claim 8, wherein rApp is an application as defined by the O-RAN specifications, and wherein the CBSD Controller application is a Non-RT RIC rApp.

10. A method of routing information for a wireless communications system having radio components including Open Radio Access Network Radio Unit (O-RU), ORAN Distributed Unit (O-DU), and ORAN Centralized Unit (O-CU), the method comprising:
providing an Open Radio Access Network (ORAN) Non-Real-Time RAN Intelligent Controller (Non-RT RIC) framework;
providing an O-RU Controller; and
providing a Citizens Broadband Radio Service Device (CBSD) Controller interfacing with a Spectrum Access System (SAS);
wherein the Non-RT RIC Framework functions as a broker to route information between the O-RU Controller and the CBSD Controller.

11. The method according to claim 10, further comprising:
utilizing the O-RU Controller as a producer of one of data type "ruInformation" or "ruInformationArray"; and
utilizing the CBSD Controller as a consumer of one of the data type "ruInformation" or "ruInformationArray".

12. The method according to claim 11, wherein the "ruInformation" data type contains at least one of the following parameters for a given O-RU:
RU Identity;
Component Carrier Identity, wherein each O-RU can support multiple component carriers in a Carrier Aggregation;
one of Common Channel Group (CCG) Identity or Single Frequency Group (SFG) Identity representing the group to which the given O-RU belongs, wherein all O-RUs obligated to use spectrum grants with the same frequency range must have one of the same CCG identity or the same SFG identity;
one of Interference Coordination Group (ICG) Identity or Spectrum Reuse Group (SRG) Identity representing a group of O-RUs that will not cause interference with one another in the case the O-Rus use spectrum grants with the same frequency range.

13. The method according to claim 11, wherein the "ruInformationArray" data type contains an array of at least one vector, each vector contains one "ruInformation" data type, and each vector contains information related to one O-RU.

14. The method according to claim 10, further comprising:
utilizing the CBSD Controller as a producer of one of data type "ruSpectrumGrant" or "ruSpectrumGrantArray"; and
utilizing the O-RU Controller as a consumer of one of data type "ruSpectrumGrant" or "ruSpectrumGrantArray".

15. The method according to claim 14, wherein the "ruSpectrumGrant" data type contains at least one of the following parameters for a given O-RU:
RU Identity;
Component Carrier Identity, wherein each O-RU can support multiple component carriers in a Carrier Aggregation;
one of Common Channel Group (CCG) Identity or Single Frequency Group (SFG) Identity representing the group to which the given O-RU belongs, wherein all O-RUs obligated to use spectrum grants with the same frequency range must have one of the same CCG identity or the same SFG identity;
low frequency, representing the lower boundary of the granted frequency range;
high frequency, representing the upper boundary of the granted frequency range; and
maximum Effective Isotropic Radiated Power (EIRP) likely to be permitted for the granted frequency range.

16. The method according to claim 14, wherein the "ruSpectrumGrantArray" data type contains an array of at least one vector, each vector contains one "ruSpectrumGrant" data type, and each vector contains information related to one O-RU.

17. The method according to claim 10, wherein the CBSD Controller is configured as an application, as part of Non-RT RIC domain.

18. The method according to claim 17, wherein rApp is an application as defined by the O-RAN specifications, and wherein the CBSD Controller application is a Non-RT RIC rApp.

19. The method according to claim 11, further comprising at least one of:
i) the O-RU Controller registers the data type "ruInformation";
ii) the Non-RT RIC Framework sets up a routing rule specifying the O-RU Controller as the producer of the data type "ruInformation"; and
iii) the Non-RT RIC Framework sets up a routing rule specifying the CBSD Controller as the consumer of the data type "ruInformation".

* * * * *